United States Patent [19]

Skweres

[11] 3,737,934
[45] June 12, 1973

[54] VEHICLE WASHING INSTALLATION WITH REVERSE WASH CYCLE

[75] Inventor: Thomas W. Skweres, Lisle, Ill.

[73] Assignee: Ross and White Company, Wheeling, Ill.

[22] Filed: June 4, 1971

[21] Appl. No.: 149,995

[52] U.S. Cl. ............................. 15/21 E, 15/DIG. 2
[51] Int. Cl. ............................................... B60s 3/06
[58] Field of Search..................... 15/DIG. 2, 21 D, 15/21 E, 53, 97

[56] References Cited
UNITED STATES PATENTS

3,278,962 10/1966 Christ................................. 15/21 E
3,559,225 2/1971 Gougoulas.......................... 15/21 D

Primary Examiner—Edward L. Roberts
Attorney—Rummler & Snow

[57] ABSTRACT

A vehicle washing installation including a lengthwise movable wash rack for washing a stationary vehicle. The lengthwise movable wash rack includes two brushes of which one of the brushes is located to wash one of the sides of the vehicle during lengthwise movement of the rack. The other of the brushes is mounted for transverse movement and is actuated at the start and end of the lengthwise movement of the rack to wash the front and rear ends of the vehicle. During the lengthwise movement, the movable brush is located to wash the opposite side of the vehicle.

4 Claims, 17 Drawing Figures

VEHICLE WASHING INSTALLATION WITH REVERSE WASH CYCLE

BACKGROUND OF THE INVENTION

The present invention relates to apparatus for automatically washing vehicles.

Heretofore automatic vehicle washers have been of two general types. In one type, the washing equipment is maintained stationary and the vehicle moves past the equipment. In the other type, the washing equipment is movable past a stationary vehicle. The latter type of equipment has generally been used for larger type vehicles such as buses, rail vehicles, and the like.

One of the main disadvantages of the prior movable washing equipment resides in the fact that the washing equipment had to be returned to its initial position before another vehicle could be washed. This reduced the rate at which a line of vehicles may be washed.

Moreover, the prior movable washing equipment generally included separate units that were located at the front and rear of the vehicle to wash the respective ends thereof. Thus only the sides were washed by a moving piece of equipment which traveled lengthwise of the vehilce.

The disadvantages of stationary washing equipment wherein the vehicle moves past or through a plurality of stationary washing stations is well known. In this type of equipment a pulling or conveying means was generally required to move the vehicle past the washing stations. These conveying means not only increased the installation costs, but also require frequent maintenance.

SUMMARY OF THE INVENTION

By the present invention it is proposed to provide a vehicle washing system which overcomes the difficulties encountered heretofore.

This is accomplished generally by a vehicle washer installation including a washer assembly that is movable lengthwise of the vehicle and carries means for washing the respective ends and the sides of the vehicle.

The movable washer assembly is in the form of an arch or rack which is guided for lengthwise movement of the vehicle. A pair of rotatable brush means is mounted on the rack for washing the sides and ends of the vehicle. One of the pair of rotatable brush means is fixidly positioned on the frame along one side of the vehicle while the other rotatable brush is mounted for lateral movement between a position adjacent the fixedly positioned rotating brush toward the other side of the vehicle. The movably mounted rotating brush washes the opposite ends of the vehicle prior to and after lengthwise movement of the rack and washes a side of the vehicle during the lengthwise travel along with the stationary position brush which washes the other vehicle side, all incorporated in the rack.

The movement of the rack and movable brush is arranged so that washing of the vehicle may be initiated from either end of the vehicle. This makes it possible to wash one vehicle from rear to front and another following vehicle from front to rear without having to return the rack to an initial start position. This arrangement reduces the time required to wash a line of vehicles waiting their turn to be washed.

DESCRIPTION OF THE PREFERRED EMBODIMENT

Figure 1:
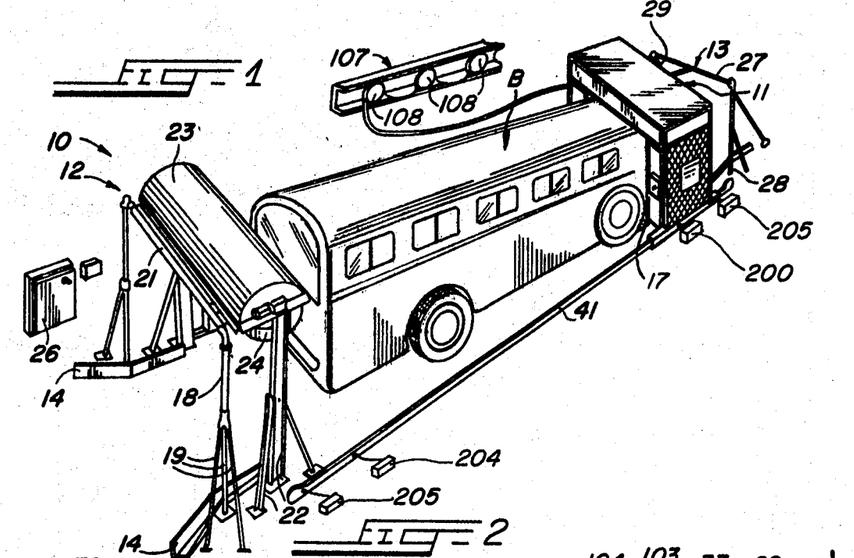
FIG. 1 is a perspective view of a vehicle washing intstallation embodying the structure of the present invention.

Referring now to the drawings, there is shown a vehicle washer installation 10 having a movable washer assembly or wash rack 11 embodying the structure of the present invention. The washer installation 10 includes roof washing assembly 12 at the entrance and rinse rack 13 at the exit for rinsing the vehicle after washing.

The vehicle washer installation 10 is described in association with the washing of a multi-passenger bus B but it should be clearly understood that the invention hereinafter described is not limited to the washing of buses and may also be used for washing various other types of vehicles.

Disposed at the entrance of the installation 10 are tire guides 14 which serve to direct the bus B into the roof washing assembly 12 and the movable wash rack 11. The foundation or floor 16 of the washer installation 10 is preferably made from concrete in which the tire guides and other floor associated members of the installation may be embedded.

Wheel chocks 17 are spaced lengthwise from the roof washing assembly 12. The wheel chocks 17 may be mounted for movement between an elevated chocking position beneath the front wheels of the bus B and a lowered position flush with the floor 16. Bus energized treadle switches (not shown) are used to raise and lower the chocks 17. The wheel chocks 17 serve to locate and maintain the bus stationary during the end and side washing cycle performed by the wash rack 11.

Located forward of the roof washing assembly 12 is an inverted U-shaped and stationary wetting arch 18 comprising generally framing members 19 which support a horizontally disposed perforate spray pipe 21. The spray pipe 21 is connected to a suitable source of water and detergent (not shown) for wetting the bus B as it enters the installation 10. The spray pipe 21 may be constructed so as to direct a spray pattern toward the front and rear of the bus B as it passes through the arch 18.

The roof wash assembly 12 includes framing members 22 fixed in the floor 16 at one end and support a hood 23. A motor driven rotatable wash brush 24 is supported in hood 23. The operation of the roof wash assembly 12 may be controlled by an automatic control circuit housed in a control panel 26. The diameter of brush 24 is selected so as to be capable of washing vehicles having different heights. This eliminates the necessity for raising and lowering the brush to compensate for height differential in a line of buses.

The rinse arch 13 at the exit end is fabricated from piping 27 which is perforated to apply a spray on the bus B as it passes through. The piping 27 is suitably braced by bracing members 28 imbedded in the floor 16. An inlet pipe 29 connects the spray piping 27 to a suitable source of rinse water (not shown).

The movable rack 11 as shown in FIGS. 2–5 is an inverted U-shaped frame having a pair of vertical side frame sections 32 and a top frame section 33. The frame may be covered with facing sheets that have been broken away in the drawings to show underlying details. The side frame sections 32 are of substantially identical structure each having a pair of lengthwise spaced upright side channels 34. Fixed to the lower ends of the channels 34 are a pair of laterally spaced horizontally disposed base channels 36 which may be of fishbelly contour.

Journaled in journal boxes 37 carried by the horizontal channels 36 are shafts 38 on which traction wheels 39 are fixed. The traction wheels 39 ride on lengthwise extending tracks 41 suitably fixed as by bolting to the floor 16.

Motors 42 mounted on suitable vertical support channels in each of the side frames 32 are used to drive associated traction wheels 39. The motors 42 are reversible and may have a 1 horsepower rating. The traction motors 42 in each of the frames 32 are connected to associated traction wheels 39 by way of drives including a flexible coupling 43, and a reduction gear unit 44 having a sprocket gear 46 which drives a sprocket 47 connected thereto by a sprocket chain 48.

The sprocket 47 is fixed to a shaft 49 journaled for rotation between a pair of spaced journals 51 (see FIG. 5) carried in the side frame section 32. Mounted on the shaft 49 are a pair of smaller sprockets 52 which drive, by way of sprocket chains 54, associated drive sprockets 53 fixed to the traction-wheel shafts 38.

The top frame section 33 (FIGS. 3, 4 and 5) comprises longitudinally spaced and transversely extending front and rear top frame beams 56 and 57 that are fixedly secured to the upper ends of the upright side channels 34. An overhead track support beam 59 is disposed between the front and rear beams 56 and 57 and is fixed at its ends to upper side beams 58 (see FIG. 4). The upper side beams 58 are secured to the upright side channels 34.

Fixed to the intermediate or track support beam 59 and the rear beams 57 are lengthwise spaced track assemblies 61 (see FIG. 3) each include a plurality of spaced angle iron support bracks 62. Angle iron strips 63 are fixed as by welding to the upper and lower edges of each of one of the legs of the support brackets 62 so as to define opposing V-shaped tracks. The angle iron strips or tracks 63 guide an overhead carriage 64 of a movable brush assembly 65.

The carriage 64 is a generally rectangular shaped open frame having side channels 66 and end channels 67. Tubular posts 68 are fastened to the side channels 66 adjacent to the corners of the carriage frame 64. The tubular posts 68 (see FIG. 3) project beyond the upper and lower edges of the channels 66 and carry opposing wheel assemblies 69. The wheel assemblies 69 include grooved wheels 71 which ride in opposing relationship to the upper and lower tracks 63 of the track assemblies 61.

A carriage drive motor 72 of the reversible type and associated with a speed reduction unit 73 is suitably mounted on supports secured to frame 67. The carriage drive motor drives the carriage from right to left or left to right as viewed in FIGS. 4 and 5. A sprocket chain 74 (FIG. 5) meshes with a sprocket 76 on the speed reduction unit 73 and a drive sprocket 77. The drive sprocket 77 is fixed to a shaft 78 rotatably journaled in bearings 84 fixed to the side beams 58.

Sprockets 79 are fixed to each end of the drive shafts 78 and drive sprocket chains 81 which also mesh with sprockets 82 carried on the respective ends of a rotatable shaft 83. The shaft 83 is journaled in bearings mounted on the opposite side beam 58. The drive sprocket chains 81 may be maintained taut by idler sprockets 86 carried by the rear channel 57 and the track support beam 59. Each of the drive sprocket chains 81 is secured at 64a to the respective ends to the end channels 67 of the carriage frame 64 so that the carriage assembly 65 may be moved lengthwise on the track assemblies 61. Thus, upon rotation of the carriage drive motor 72 in either a clockwise or counter clockwise direction, the carriage 64 frame will be pulled by the sprocket chain 81 either from right to left or left to right.

Figure 2:
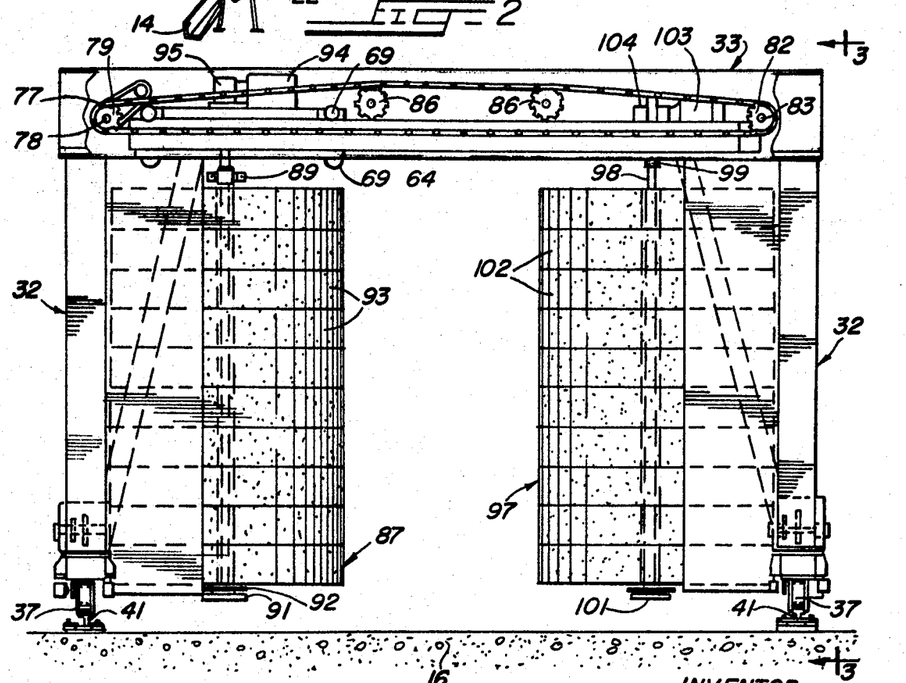
FIG. 2 is a front veiw of the movable wash rack of the present invention with the facing sheets broken away to show underlying details of structure.
Figure 3:
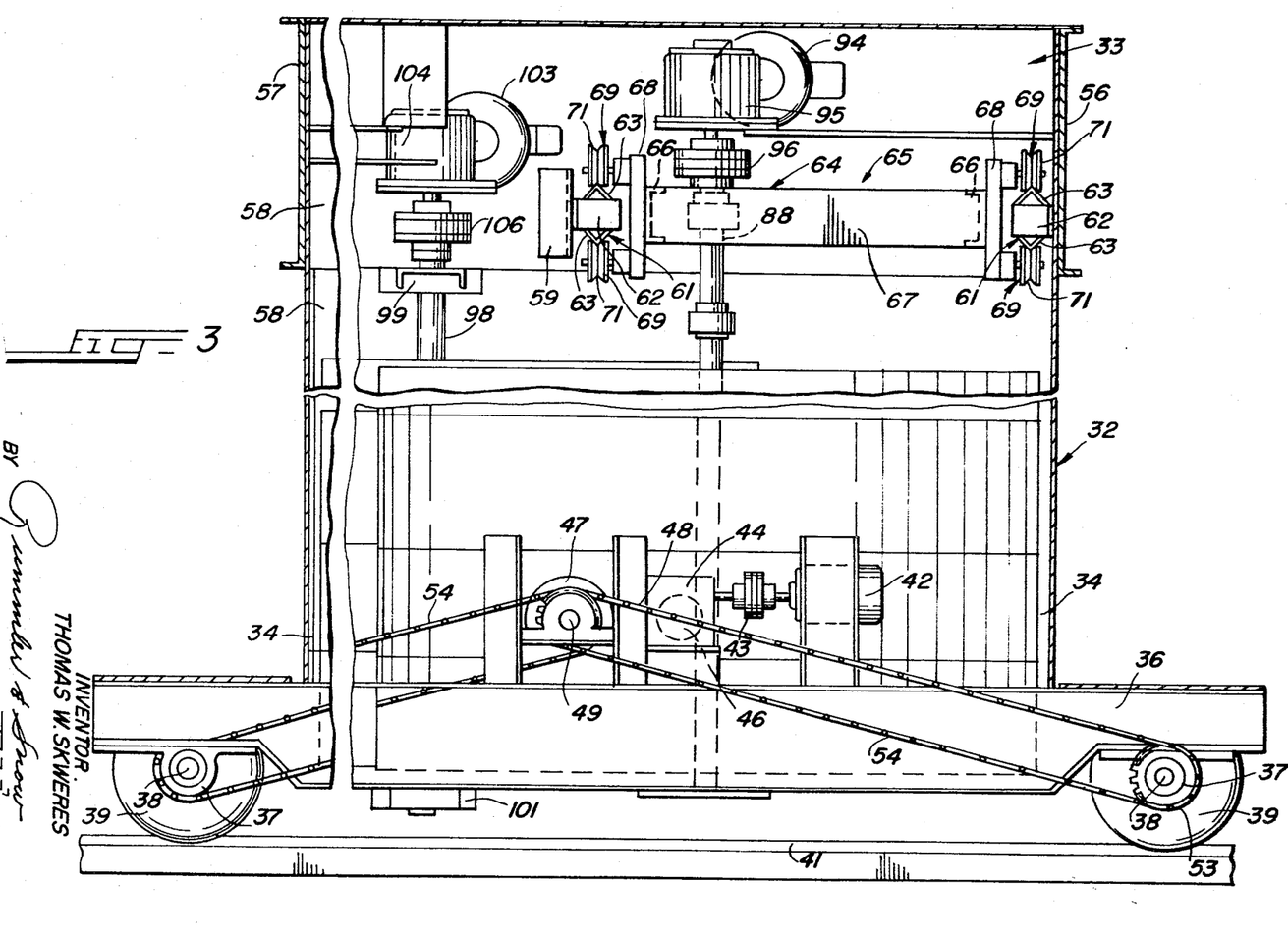
FIG. 3 is an enlarged fragmentary side view of the wash rack taken generally along the lines 3—3 of FIG. 2, with the facing sheets broken away.

A carriage brush unit 87 is mounted on the carriage frame 64 for lengthwise movement therewith. The carriage brush unit 87 as shown in FIG. 2 includes a hollow shaft 88 which is suspended from and journaled in bearings 89 mounted on support framing fixed to the carriage frame 64. A rotating bearing guard 91 and a roller bearing assembly 92 are attached to the lower end of the shaft 88. Brush elements 93 of the disc type in disposable aluminum cores are fixed to the shaft 88. The brush elements 93 are made from plastic such as polypropelene of hollow spaghetti-like design. Water is introduced to the brush unit 87 in the well known manner and is not shown.

The carriage brush unit 87 of the carriage assembly 65 is powered by a reversible motor 94 carried on framing members of the carriage frame 64. The carriage brush motor 94 is connected to a speed reducer unit 95 which is connected to drive the brush shaft 88 by a flexible disc coupling 96.

A second or stationary positioned brush unit 97 is mounted in the forward section of the top frame section 33. The second brush unit 97 is substantially identical to the carriage brush unit 87 and includes a hollow brush shaft 98 journaled and suspended at its upper end in bearing assemblies 99 mounted on framing members. The shaft 98 is also supported at its lower end in a bearing 101.

The brush elements 102 are of the same structure as the brush elements 93 including hollow brush elements and water is supplied thereto in the well known manner.

A reversible motor 103 supported on the frame is used to operate the brush assembly 97. The motor 103 is connected to a speed reduction unit 104 which is coupled to the shaft 98 by a flexible disc coupling 106.

As shown in FIG. 1, a power track 107 in the form of a C-shaped channel is mounted along one side of the tracks 41. The power track 107 includes a plurality of trolleys 108 which carry the power line and water line to the equipment mounted in the movable rack assembly 11.

Figure 10:
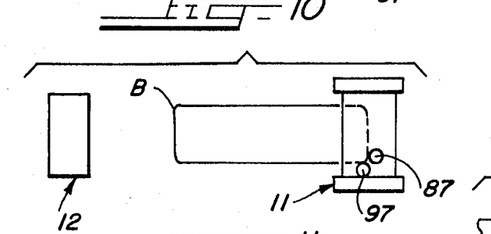
Figure 11:
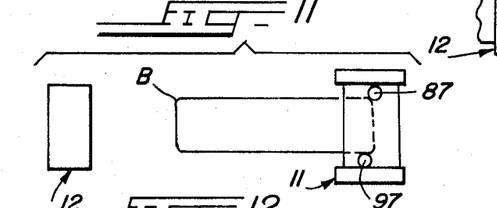

In operation, the bus B is driven into the wash installation with the front wheels against the elevated chocks 17 which are elevated by the bus energizing treadle switch (not shown). With the rack 11 at the fornt or forward end of the bus B, the motor 72 is energized thereby to drive the carriage frame 64 by means of the sprocket chain 74, sprocket 79 mounted on the shaft 78, sprocket 82 mounted on the shaft 83 and the drive sprocket chains 81 of which the ends are fixed to carriage frame at 64a. Movement of the carriage frame 64 and the brush unit 87 carried thereby is from the position shown in FIG. 8 toward the opposite side of the rack 11 to the position shown in FIG. 9. The rack drive motors 42 are energized to move the rack 11 to the position shown in FIGS. 10 and 11. At the same time, the motor 94 is energized so that the brush unit 87 is rotated and water is supplied thereto. The brush unit 87 is thus operative to wash the front end of the bus B. When the carriage 64 and the brush unit 87 carried thereon are positiioned along the opposite side of the bus as shown in FIG. 11, the carriage motor 94 is de-energized and the motor 103 is energized to rotate the stationary brush unit 97.

The traction motors 42 are then energized to drive the traction wheels 39 by way of the flexible coupling 43, gear reduction unit 44, sprocket 46, sprocket chain 48, sprocket 47, sprockets 52, sprocket chains 54 and sprocket 53. The rack 11 is thus driven lengthwise on the tracks 41. During the lengthwise travel along the tracks, the brush units 87 and 97 continue to rotate and wash the sides of the bus B.

Figure 13:
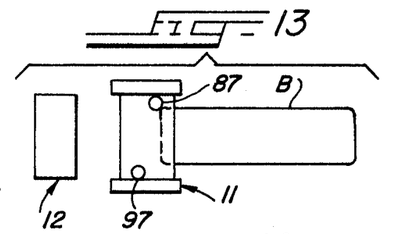
Figure 14:
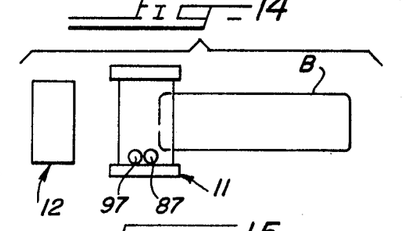
Figure 15:
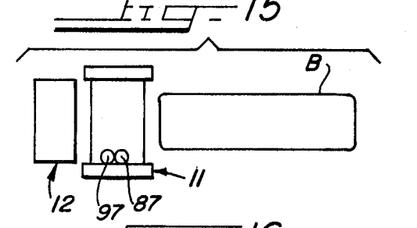

Upon reaching the rear end of the bus B, the rack 11 stops and the brush unit 97 stops rotating. The brush unit 87 continues to rotate and the carriage motor 72 is energized so that the carriage frame 64 moves transversely on the rack 11 toward the stationary brush unit 97. When the brush unit 87 reaches the brush unit 97, the brush unit motor 94 and thereafter the carriage motor 72 are de-energized. During the transverse movement of the brush unit 87, the rear of the bus B is washed, as shown in FIG. 13. In the stopped position, the brushes 97 and 87 are in longitudinal side-by-side relationship, as shown in FIG. 14. Thereafter the rack motors 42 are again energized so that the bursh 87 is moved out of engagement with the end of the bus B, as shown in FIG. 15.

The wash sequence from the rear to the front is substantially the same with the exception that the rack 11 moves lengthwise from the rear to the front of the bus during the wash operation.

Figure 6A:
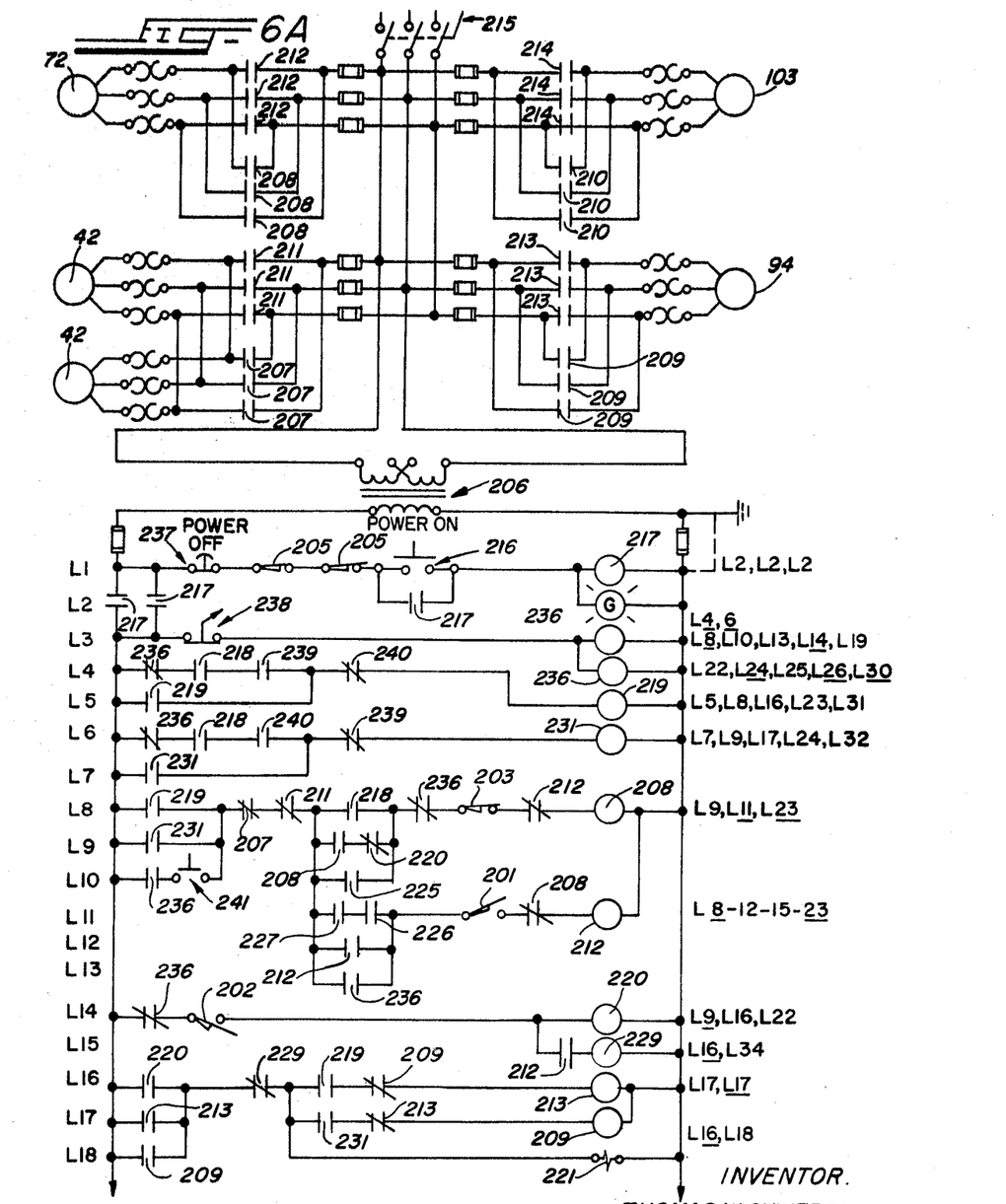
FIGS. 6A and 6B are an elementary schematic wiring diagram of the control system for operating the washing system of the present invention.

Referring now in particular to FIGS. 6A and B, and 7-16, the operation and control circuitry for operating the washer rack 11 will now be described in greater detail. A bus B enters the installation through roof washing assembly 12 guided by the tire guides 14. As the bus B passes through the roof washing assembly 12, the control system therefor housed in the control panel 26 is actauted so that the water and detergent is applied on the bus roof, front, sides and rear. At the same time, the wash brush 24 is energized to wash the roof.

Figure 7:
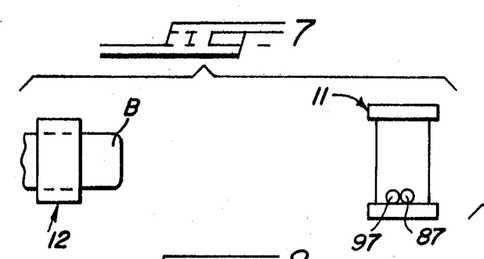
FIGS. 7, 8, 9, 10, 11, 12, 13, 14, 15 and 16 are sequential schematic illustrations showing the relative positions of the wash rack, the stationary brush assembly and the movable brush assembly during a wash cycle.

The bus B continues between the tracks 41 and is stopped and held positioned by the chocks 17 which are elevated by the bus actuated treadle switch. The movable wash rack 11 is located at the exit end of the washer installation 10 so as to be positioned at the forward end of the bus B as shown in FIG. 7. The movable carriage brush assembly 65 carrying the brush 87 is located adjacent the fixed brush 97.

In this position of the rack 11 (see FIGS. 3 and 6A and 6B), a forward limit switch 200 is held tripped by the rack 11. Also, with the movable brush unit 87 located adjacent to the fixed brush unit 97, a carriage limit switch 201 is held trip by the carriage assembly 65. It is to be noted that there are two other limit switches 202 and 203 which are actuated as the carriage assembly 65 moves transversely or forward across the front end of the bus along the carriage track 61.

Also mounted on the rack 11 is a rear limit switch 204 located adjacent the rear end of the bus B. Associated with the forward and reverse limit switches 200 and 204 are over-travel switches 205 which serve to de-energize the control circuit if the rack 11 should over-travel either of the limit switches 200 or 204 without stopping. For purposes of illutration, the forward limit limit switch 200, rear limit switch 204 and over-travel switches 205 are shown mounted on the floor for actuation by the rack. In actual practice, however, these switches may be mounted on the rack and actuated by shoes mounted on the floor.

Figure 6B:
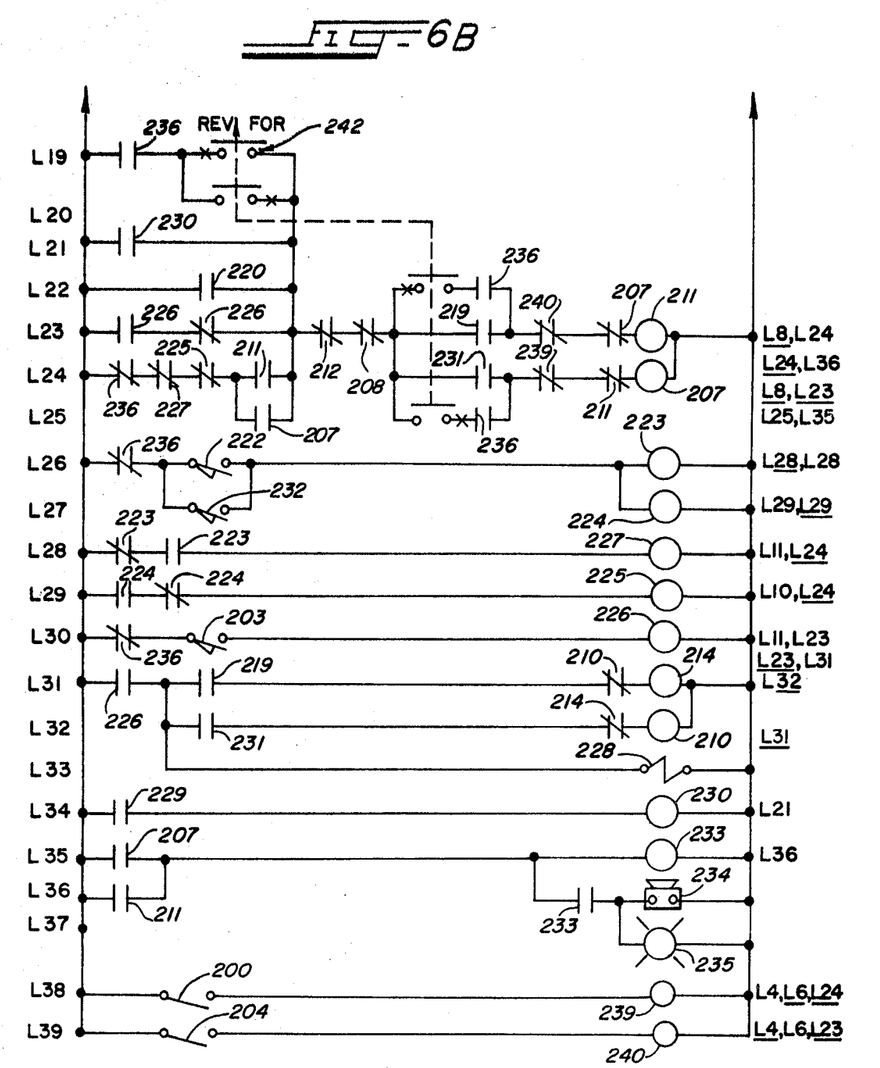

As shown in the elementary wiring diagram of the control circuit in FIGS. 6A and 6B, the rack motors 42, carriage motor 72, the carriage brush motor 94 and stationary brush motor 103 are connected to three-phase power. The designations along the right hand side of the diagram indicate the line connections. As heretofore described, the traction motors 42, carriage motor 72, carriage brush motor 94 and stationary brush motor 103 each are three-phase reversible motors and to this end, the motor circuits are each provided with motor starters 207, 208, 209 and 210, respectively, for energizing the forward windings and reverse motor starters 211, 212, 213 and 214, respectively, for energizing the reverse winding. The control circuit is connected to a suitable source of current at the power track 107 by a line switch 215. Each of the motor circuits is also suitably fused.

As heretofore described, in the position of the wash rack 11 shown in FIGS. 1 and 3 and FIGS. 6A and 6B, the forward limit switch 200 in lines L38 which energizes relay 239 shown on the line L4 and L24 and L6 whereby switch 200 is released by the rack 11. The carriage limit switch 201 in line L11 is also held tripped. The automatic control circuit is then initaited by momentarily depressing a control power switch 216 in line L1 thereby to energize a control relay 217 to close the circuit to the control circuitry. This condition is indicated by a power-on light G in line L2 which is connected in parallel with relay coil 217.

A treadle switch adjacent to wheel chocks 17 is actuated momentarily by front wheel of bus B to energize remotely located control relay 218. When the forward limit switch 200 is held tripped. control relay 239 in line L38 is energized to subsequently energize control relay 219 in line L5 to initiate the reverse wash cycle of the carriage brush assembly 87 and the rack 11.

Figure 9:
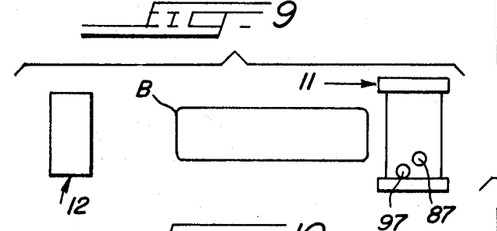

Initially, as shown in line 8 of FIG. 6, the carriage control circuit is energized by energized control relays 218 and 219 whereupon the carriage forward control starter coil 208 in line L8 is energized to start the carriage motor 72 in a forward direction whereupon the carriage limit switch 201 (see FIG. 4) is released and the carriage limit switch 202 in line L14 is momentarily tripped and then released. The position of the brush 87 is shown in FIG. 9.

In the tripped condition of the limit switch 202, a control relay 220 in lines L9, L14, L16 and L22 is energized, and the carriage motor starter coil 208 is de-energized to stop the carriage motor 72. At the same time, the rack reverse starter coil 211 is energized whereby the rack motors 42 are operative to move the rack 11 back toward the entry end of the wash installation so that the brush units 87 and 97 assume the posotion shown in FIG. 10. Also, the brush motor starter coil 213 in line L16 is energized so that the carriage brush motor 94 rotates counter clockwise and a water solenoid valve 221 is turned on to provide water to the brush.

When the rack 11 moves back, the limit switch 200 (see FIG. 4) is released. The rack 11, however, engages and trips a reverse hip switch 222. Tripping of the hip switch 222 energizes time delay relays 223, 224 and 225 in lines L26, L27 and L29, so that the rack motors 42 and thereby the rack 11 is stopped for a period during which the rack motor reverse starter coil 211 is de-energized. The carriage forward motor starter coil 208 is then energized to continue movement of the carriage assembly 65 forward to wash the front of the bus B during the period the rack 11 is stationary, as shown in FIG. 11.

Figure 4:
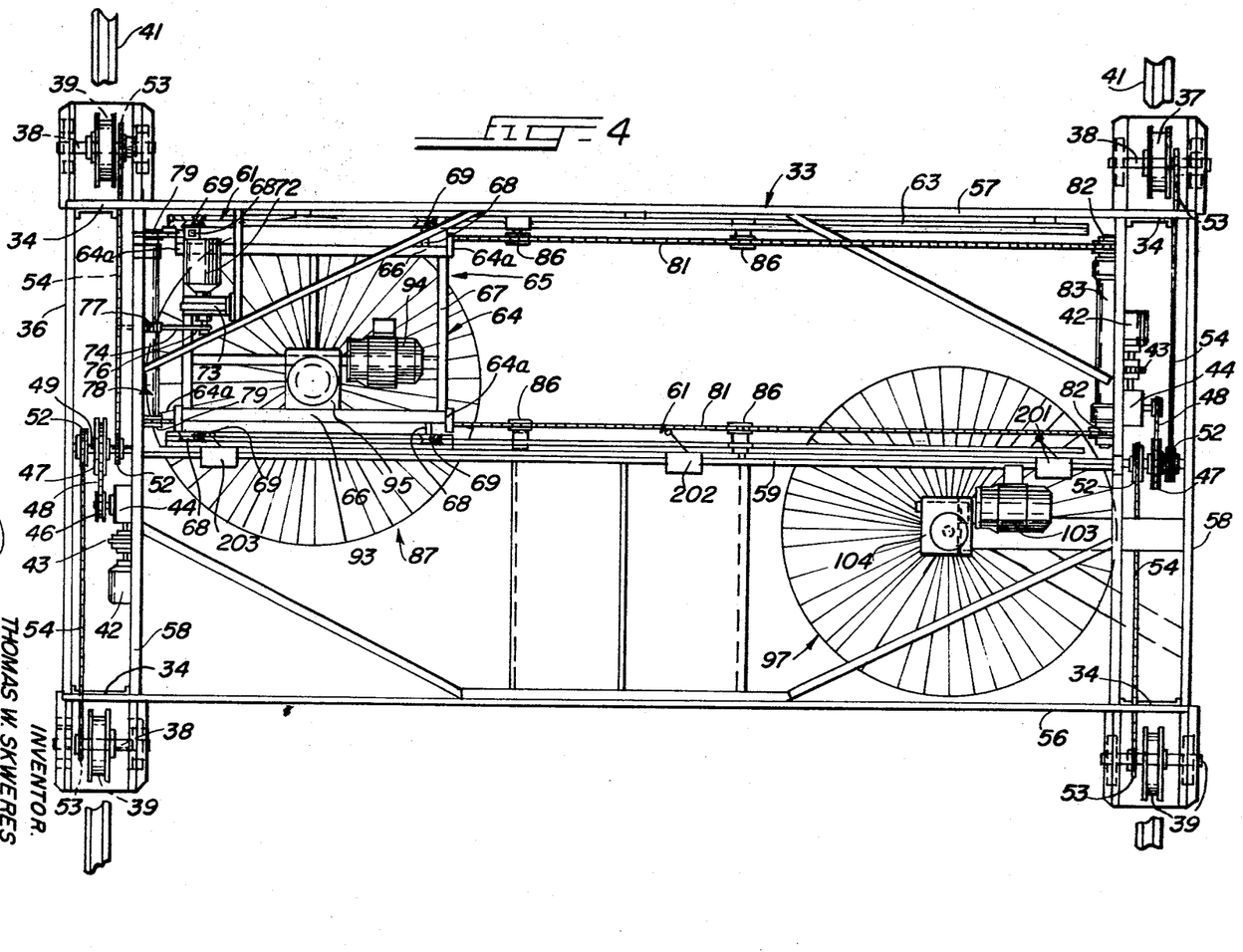
FIG. 4 is a top plan view of the wash rack with the facing sheets broken away.
Figure 5:
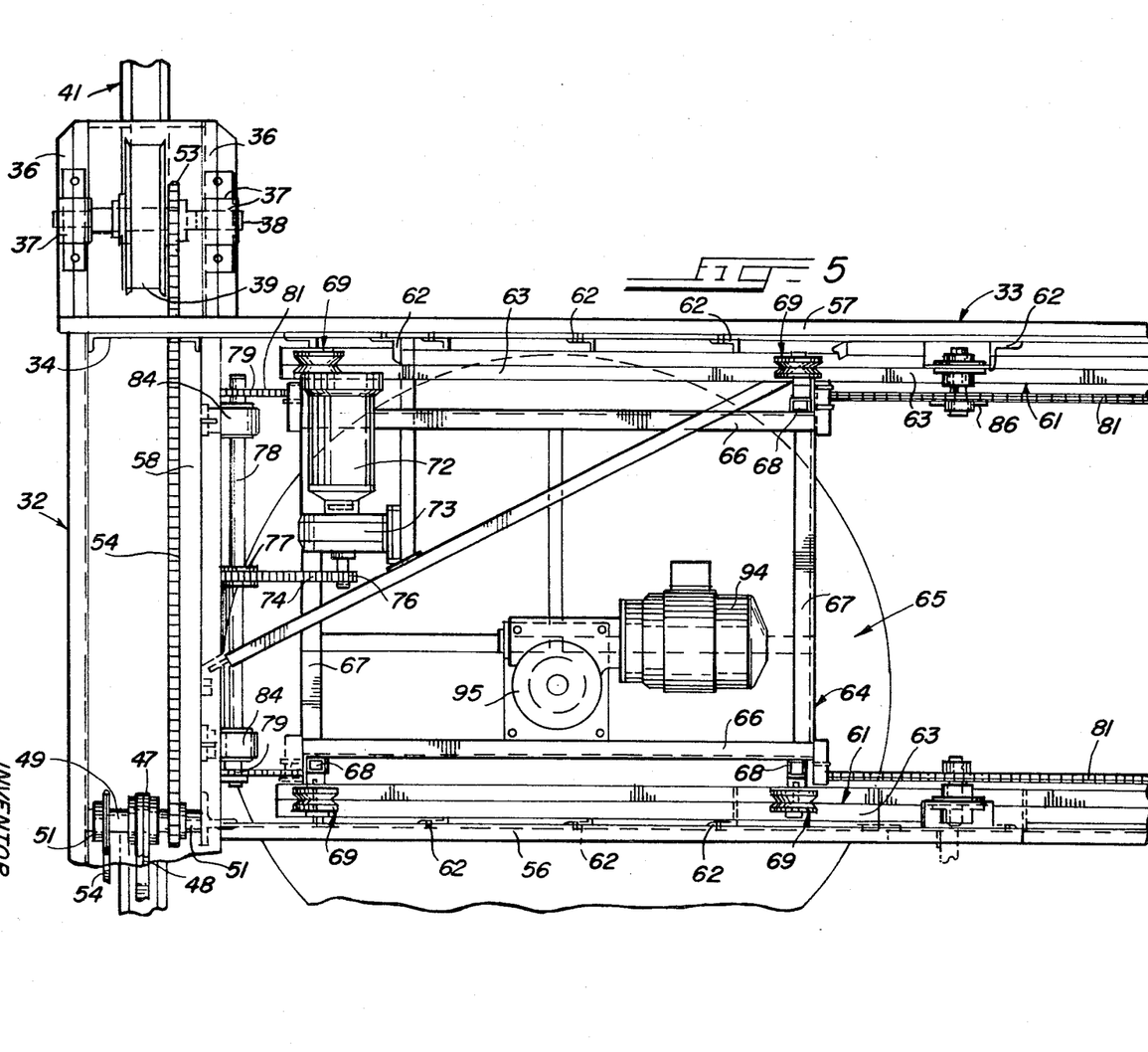
FIG. 5 is an enlarged fragmentary top plan view of the wash rack showing in particular the movable brush assembly including the drive means for moving the assembly and the means for rotating the brush.

Upon reaching the end of the travel adjacent the opposite side of the bus B, the carriage assembly 65 trips the carriage limit switch 203 (see FIG. 4). This causes the carriage forward starter coil 208 to be de-energized so that the carriage motor 72 stops.

Figure 12:
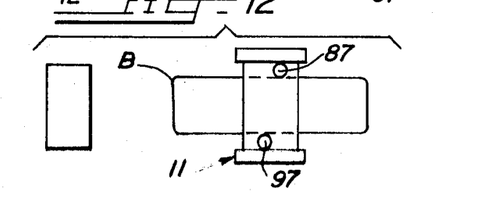

At this time, timing relay 226 in line L30 is energized. The reverse motor starter for the rack motors 42 is energized by its coil 211 in line L23 so as to move the rack 11 along the tracks back to the rear of the bus B as shown in FIG. 12.

At the same time, the brush reverse starter coil 214 in line L31 (for energizing the reverse winding of the brush motor 103) is energized so that the brush unit 97 is rotated clockwise. Also, a solenoid operated water valve 228 is energized so that water is supplied to the brush unit 97.

Both brush units 87 and 97 are now rotating. Brush unit 87 rotating counter clockwise; and brush unit 97 rotating clockwise with water being supplied thereto. As the rack 11 approaches the rear of the bus B, it releases the rear hip switch 222. Upon release of rear hip switch 222, the time delay relay 227 in line L28 is energized while the time delay relay 223 in line L26 is de-energized. After a time delay (to allow the brush unit 87 to clear the rear of the bus B as shown in FIG. 13), the reverse motor starter for the rack motors 42 is de-energized by its coil 211 in line L23 to stop the movement of the rack 11. At the same time, the carriage reverse motor starter coil 212 is energized and the carriage motor 72 is rotated so that the carriage 64 is pulled by the sprocket chain 81 toward the initial starting position.

As the carriage moves back, it releases carriage limit switch 203 in lines L8 and L30 so that the reverse brush starter coil 214 in line L31 is de-energized, thereby stopping the motor 103. At the same time, solenoid water valve 228 is also de-enertized to cut off the water supply to the brush 97.

The carriage assembly 65 trips and releases the carriage limit switch 202 whereupon the control relays 220, 229 and the timing relay 230 are momentarily energized to de-energize the brush reverse motor starter coil 213 in line L16 and the brush water solenoid valve 221 in line L18, thereby stopping the brush rotation and shutting off the water supply to the brush assembly 87. De-energized timing relay 230 will hold contact closed (shown in line L21) for a timed interval to permit rack motors 42 to be energized at a later time.

Carriage 64 continues to move until it engages and trips limit switch 201, at which time the carriage reverse starter coil 212 in line L11 is de-energized so that the carriage motor 72 is stopped, as shown in FIG. 14. At the same time, the reverse motor starter coil 211 of the rack motors 42 is energized, thereby moving the rack 11 until the latter trips the reverse limit switch 204, at which time control relay 240 in line L39 is energized to cause control relay 219 in line L5 and rack reverse motor starter coil 211 in line L23 to be de-energized. At this time, the rack 11 is stopped, and the reverse wash cycle is completed, as shown in FIG. 15.

Figure 16:
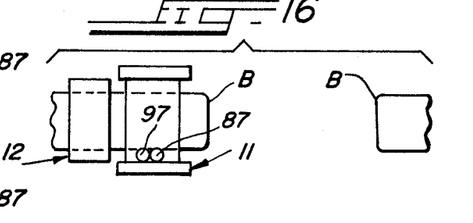

Upon completion of the wash cycle, the wheel chocks are lowered and the bus B is driven out through the rinse rack 13. Another bus to be washed may then be driven into the installation, as shown in FIG. 16. When the next bus is positioned in the installation, the rack 11 is located at the rear end of the bus so that the washing is performed from the rear to the front or forward end.

The rear to forward or forward wash cycle is substantially the same as that described in connection with the forward to rear or reverse wash cycle. Tripping of the reverse limit switch 204 in line L39 energizes control relay coil 240 in line L39 to energize control relay coil 231 in line L6, which prepares circuit for the forward wash cycle.

The forward wash cycle is initiated by the momentary actuating of the treadle switch and the subsequent momentary energizing of the remotely located control relay 218, which energizes control relay coil 231 in line L6.

The carriage circuit is energized by energized control relay coils 218 and 231 whereupon the carriage forward control starter coil 208 in line L8 is energized to start the carriage motor 72 in a forward direction, whereupon the carriage limit switch 201 is released and the carriage limit switch 202 in line L14 is momentarily tripped and then released.

In the tripped condition of the limit switch 202, a control relay 220 in lines L9, L14, L16 and L22 is energized, and the carriage motor starter coil 208 is de-energized to stop the carriage motor 72. At the same time, the rack forward starter coil 207 is energized whereby the rack motors 42 are operative to move the rack 11 forward toward the exit end of the wash installation. Also, the brush motor starter coil 209 in line L17 is energized so that the carriage brush motor 94 rotates clockwise and a water solenoid valve 221 is turned on to provide water to the brush.

When the rack 11 moves forward, the limit switch 204 is realesed. The rack 11, however, engages and trips a forward hip switch 232. Tripping of the hip switch 232 energizes time delay relays 223, 224 and 225 in lines L26, L27 and L29, so that the rack motors 42 and thereby the rack 11 is stopped for a period during which the rack motor forward starter coil 207 is de-energized. The carriage forward motor starter coil 208 is then energized to continue movement of the carriage assembly 65 forward to wash the rear of the bus B during the period the rack 11 is stationary.

Upon reaching the end of the travel adjacent the opposite side of the bus B, the carrige assembly 65 trips the carriage limit switch 203. This causes the carriage forward starter coil 208 to be de-energized so that the carriage motor 72 stops.

At this time, timing relay 226 in line L30 is energized. The forward motor starter for the rack motors 42 is energized by its coil 207 in line L24 so as to move the rack 11 along the tracks forward to the front of the bus B.

At the same time, the brush forward starter coil 210 in line L32 (for energizing the forward winding of the brush motor 103) is energized so that the brush unit 97 is rotated counter clockwise. Also, a solenoid operated water valve 228 is energized so that water is supplied to the brush unit 97.

Both brush units are now rotating. Brush unit 87 rotating clockwise, and brush unit 97 rotating counter clockwise with water being supplied thereto. As the rack 11 approaches the front of the bus B, it releases the front hip switch 232. Upon release of front hip switch 232, the time delay relay 227 in line L 28 is energized while the time delay relay 223 in line L26 is de-energized. After a time delay (to allow the brush unit 87 to clear the front of the bus B), the forward motor starter for the rack motors 42 is de-energized by its coil 207 in line L24 to stop the movement of the rack 11. At the same time, the carriage reverse motor starter coil 212 is energized, and the carriage motor 72 is rotated so that the carriage 64 is pulled by the sprocket chain 81 toward the initial starting position.

As the carriage moves back, it releases carriage limit switch 203 in lines L8 and L30 so that the forward brush starter coil 210 in line L32 is de-energized, thereby stopping the motor 103. At the same time, solenoid water valve 228 is also de-energized to cut off the water supply to the brush 97.

The carriage assembly 65 trips and releases the carriage limit switch 202 whereupon the control relays 220, 229 and the timing relay 230 are momentarily energized to de-energize the brush forward motor starter coil 209 in line L17 and the brush water solenoid valve 221 in line L18, thereby stopping the brush rotation and shutting off the water supply to the brush assembly 87. De-energized timing relay 230 will hold contact closed (shown in line L21) for a timed interval to permit rack motors 42 to be energized at a later time.

Carraige 64 continues to move until it engages an trips limit switch 201, at which time the carriage reverse starter coil 212 in line L11 is de-energized so that the carriage motor 72 is stopped. At the same time, the forward motor starter coil 207 of the rack motors 42 is energized, thereby moving the rack 11 until the latter trips the forward limit switch 200, at which time control relay 239 in line L38 is energized to cause control relay 231 in line L6 and rack forward motor starter coil 207 in line L24 to be de-energized. At this time the rack 11 is stopped, and the forward wash cycle is completed.

In both the forward and reverse cycles, an intermittently operating relay 233 in line L35 is energized so as to activate a signal horn 234 and signal light 235.

Figure 8:
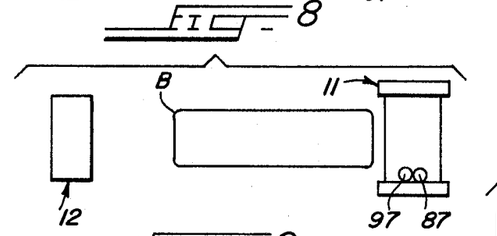

The above described explanation pertains to the automatic operation only. In the event of momentary power interruption and subsequent interruption of automatic sequencing, manual over-ride switches are provided to enable the rack to be moved lengthwise to either end of its track; and to move the carriage transversely to its starting position, as indicated in FIGS. 8 and 15.

Although but one specific embodiment of this invention has been herein shown and described, it is to be understood that numerous details may be altered or omitted without departing from the spirit of this invention as defined in the following claims.

I claim:

1. A vehicle washing apparatus for washing a stationary vehicle comprising:
   a wash rack of substantially inverted U-shape movable lengthwise of the vehicle,
   a first and second vertical brush means mounted on said rack for cleaning both sides, the front and the back of said vehicle, each of said brush means being rotatable about a vertical axis,
   means mounting said first brush means at one side of the rack and means mounting the second brush means for movement between the sides of the rack,
   motors and means for automatically controlling the motors to move said brush means through a cleaning cycle for cleaning said vehicle,
   said cleaning cycle being initiated with both brush means positioned at the same side of the rack with their vertical axes spaced from each other in the direction of movement of the rack and with each axis in a plane substantially parallel to said direction of movement, and said cleaning cycle comprising moving said second brush means to the other side of the rack to clean the front of said vehicle in a single pass, moving said rack along the length of the vehicle from its front to its back to clean both sides of the vehicle with said brush means and then moving said second brush means back across the rack to its initial position at the same side of the rack as said first brush means to clean the back of the vehicle in a single pass and to complete the cleaning cycle.

2. A vehicle washing apparatus as claimed in claim 1, wherein said motors are automatically controlled to move said brush means through a second cleaning cycle for cleaning a second vehicle, said second cleaning cycle being initiated with said second brush means at the same side of the rack as said first brush means in the position of the end of said first cycle, said second cleaning cycle comprising moving said second brush means to the other side of the rack to clean the back of said second vehicle in a single pass, moving said rack along the length of said vehicle from its back to its front to clean both sides of said vehicle with said brush means and then moving said second brush means back across the rack to its initial position at the same side as the first brush means to clean the front of the vehicle in a single pass and to complete the second cycle.

3. A vehicle washing apparatus as claimed in claim 1 wherein said cleaning cycle includes first moving said second brush means only part way towards the other side of the rack and then moving said rack towards the vehicle and completing the movement of said second brush means to said other side of the rack.

4. A vehicle washing apparatus as claimed in claim 3 wherein said washing cycle includes moving said rack away from said vehicle at the end of the cycle after said second brushing means is at the same side of the rack as said first brush means whereby said apparatus is in position to start a second cleaning cycle for a second vehicle and return to the position of the rack and brushes at the initiation of the first cycle.

* * * * *